United States Patent
Christison

(10) Patent No.: US 7,021,249 B1
(45) Date of Patent: Apr. 4, 2006

(54) HYDROGEN ADDITION TO HYDROCARBON FUEL FOR AN INTERNAL COMBUSTION ENGINE

(76) Inventor: J. Devon Christison, 523 Hunters Den, Houston, TX (US) 77079

( * ) Notice: Subject to any disclaimer, the term of this patent is extended or adjusted under 35 U.S.C. 154(b) by 172 days.

(21) Appl. No.: 10/653,546

(22) Filed: Sep. 2, 2003

(51) Int. Cl.
  *F02B 43/08* (2006.01)
  *F02M 25/12* (2006.01)
(52) U.S. Cl. .................................. 123/3; 123/DIG. 12
(58) Field of Classification Search .................... 123/3, 123/DIG. 12; 204/266
  See application file for complete search history.

(56) References Cited

U.S. PATENT DOCUMENTS

| | | |
|---|---|---|
| 40,805 A | 12/1863 | Arbos |
| 2,295,209 A | 9/1942 | Guiles et al. |
| 2,565,068 A | 8/1951 | Drabold |
| 3,648,668 A | 3/1972 | Pacheco |
| 4,041,910 A | 8/1977 | Houseman |
| 4,111,160 A | 9/1978 | Talenti |
| 4,112,875 A | 9/1978 | Laumann et al. |
| 4,442,801 A | 4/1984 | Glynn et al. |
| 5,119,768 A | 6/1992 | Russell |
| 5,211,828 A * | 5/1993 | Shkarvand-Moghaddam .... 204/266 |
| 5,513,600 A | 5/1996 | Teves |

* cited by examiner

*Primary Examiner*—Andrew M. Dolinar
*Assistant Examiner*—Katrina Harris

(57) ABSTRACT

A method and apparatus for hydrogen generation for enriching a hydrocarbon based fuel for an internal combustion engine with hydrogen extracted from a saltwater, electrolyte solution through electrolysis. A current is applied to a positively charged anode and a negatively charged cathode submerged in a saltwater solution to dissociate and separate diatomic molecules of hydrogen and oxygen therefrom. The harvested hydrogen is delivered to the carburetor of the engine through a mixing tube venturi and introduced to the hydrocarbon fuel being pumped thereto and the hydrogen and hydocarbon fuel are mixed and atomized prior to delivery to the combustion chamber.

13 Claims, 10 Drawing Sheets

HYDROGEN ADDITION TO HYDROCARBON FUEL FOR AN INTERNAL COMBUSTION ENGINE

BACKGROUND OF THE INVENTION

1. Field of the Invention

The present invention relates generally to internal combustion engines and, more specifically, to a device for dissociating diatomic molecules of hydrogen and oxygen from salt water, such as sea or ocean water, and using the hydrogen as a fuel source in an internal combustion engine either as a sole fuel source or as a fuel additive for hydrocarbon fuels.

The use of salt water from the seas and oceans as a fuel source would provide an essentially unlimited supply of fuel that is non-pollutant and readily available to most of the world inhabitants irrespective of borders and substantially reduce the dependency on limited oil resource and the pollutants associated with hydrocarbon production.

While there have been numerous applications of hydrogen production using water, a need exists to produce hydrogen as a fuel without using another limited resource-potable water.

A more compelling reason to use salt water for the production of hydrogen is that the electrolysis achieves a higher degree of energy efficiency by reducing the voltage need to drive the current between the electrodes. Since water is a poor conductor of electricity, the use of salt water provides a current path that is more efficient than water and doesn't require additives to the electrolyte solution to enhance current flow.

2. Description of the Prior Art

There are other devices designed for generating hydrogen. Typical of these is U.S. Pat. No. 40,805 issued to Arbos on Dec. 8, 1863.

Another patent was issued to Guiles et al. on Sep. 8, 1942 as U.S. Pat. No. 2,295,209. Yet another U.S. Pat. No. 2,565,068 was issued to Drabold on Aug. 21, 1951 and still yet another was issued on Mar. 17, 1972 to Pacheco as U.S. Pat. No. 3,648,668.

Another patent was issued to Houseman on Aug. 16, 1977 as U.S. Pat. No. 4,041,910. Yet another U.S. Pat. No. 4,111,160 was issued to Talenti on Sep. 5, 1978. Another was issued to Laumann et al. on Sep. 12, 1978 as U.S. Pat. No. 4,112,875 and still yet another was issued on 4,442,801 to Glynn et al. as U.S. Pat. No. 4,442,801.

Another patent was issued to Russell on Jun. 9, 1992 as U.S. Pat. No. 5,119,768. Yet another U.S. Pat. No. 5,513,600 was issued to Teves on May 7, 1996. Another was published on Aug. 16, 2001 as publication Number U.S. 2001/0013321 to Knowlton et al. and still yet another was issued on Apr. 25, 2001 to Souza as Canadian Patent No. 2,287,270.

The production of a gaseous mixture, composed of oxide of carbon, of hydride, of azote, and of a small proportion of carburet of hydrogen, said compound-being combined with air and used as a. motive power, in the manner hereinbefore set, forth.

A fuel feeding apparatus for an internal combustion engine, comprising a tank for holding water, and having means for placing the water under pressure, a closed conduit connecting the tank and the engine intake, a coil in the conduit for receiving water from the tank, means for heating the coil whereby the water is turned into steam, a container for steel wool in the conduit and mounted to receive steam from the coil outlet and to discharge into the engine intake, means for heating the container whereby the steam passing over the steel wool is reduced in part for producing free hydrogen and whereby mixed steam and free hydrogen is fed to engine intake, and means for adding air to the mixture after it leaves the container.

In an internal combustion engine having a. carburetor and an exhaust manifold, a device for decomposing water by electrolysis, said device including a water receptacle capable of holding a predetermined quantity of water and a layer of molten paraffin on the top of the water, means to conduct heat to said layer from the exhaust manifold to maintain it in molten state, means to collect the gases produced by electrolysis after they pass through said molten layer, and a conduit delivering said gases into the carburetor.

A gas-operated internal-combustion engine adapted to drive a vehicle and having a carburetor, comprising:
A. a gas generator mounted on said vehicle, said generator including a tank having a salt-water electrolyte and a magnesium electrode suspended in said electrolyte to cause hydrogen to evolve in the tank,
B. adjustable means coupled to said generator to vary the rate at which hydrogen is evolved in said tank,
C. means to feed hydrogen from said tank into said carburetor to intermix with air to produce a combustible mixture,
D. means to supply said mixture to the cylinders of said engine,
E. means to sense the amount of hydrogen consumed by the engine to produce a control signal as a function thereof, and
F. means responsive to said control signal to operate said adjustable means whereby the amount of hydrogen evolved is not substantially in excess of that required by the engine.

An arrangement for an internal combustion engine is provided in which one or more of the cylinders of the engine are used for generating hydrogen rich gases from hydrocarbon fuels, which gases are then mixed with air and injected into the remaining cylinders to be used as fuel. When heavy load conditions are encountered, hydrocarbon fuel may be mixed with the hydrogen rich gases and air and the mixture is then injected into the remaining cylinders as fuel.

A process and mechanism for producing hydrogen by electrolysis aboard a vehicle, means for controlling the hydrogen thereby produced, and operating an internal combustion engine with trace amounts of the hydrogen, air and a vehicle-carried hydrocarbon fuel whereby the traces of hydrogen maximize full savings in fuel and reduce pollutants and wherein a triangularly-shaped, separator within a hydrogen oxygen producer reduces costs and increases efficiency. The invention herein exhausts the oxygen to atmosphere with beneficient consequences and utilizes a small amount of hydrogen to enhance the qualities of a hydrocarbon fuel.

A hydrogen-oxygen fueled internal combustion engine is described herein, which utilizes an inert gas, such as argon, as a working fluid to increase the efficiency of the engine, eliminate pollution, and facilitate operation of a closed cycle energy system. In a system where sunlight or other intermittent energy source is available to separate hydrogen and oxygen from water, the oxygen and inert gas are taken into a diesel engine into which hydrogen is injected and ignited. The exhaust is cooled so that it contains only water and the inert gas. The inert gas in the exhaust is returned to the engine for use with fresh oxygen, while the water in the exhaust is returned to the intermittent energy source for reconversion to hydrogen and oxygen.

A combustion engine is provided with a fuel supplementation system in which water is broken down by electrolysis into hydrogen and oxygen which are then added to the fuel delivery system. The electrolysis takes place in a chamber in which a pusher gas rises through perforated horizontal electrode plates to sweep the hydrogen and oxygen from the plates as it is generated, thereby preventing the accumulation of these gases in the chamber. In addition, the electrolyte can be circulated, passing it through a filter, to increase the turbulence and agitation within the chamber. The rate at which the water is electrolyzed is varied, as by modulating the voltage applied to the plates, in accordance with the throttle position of the engine. Since gases do not accumulate in the chamber, variations in the rate at which these gases are yielded are affected substantially instantaneously. Lignite activated water can be added to the electrolyte to inhibit the formation of sludge.

This invention will place less demand on petroleum fuel used in a combustion engine by recycling the exhaust gases, primarily carbon monoxide, used as a reducing agent when combined with hydrogen from the on-board hydrogen generator and will produce a cooler and much less polluting exhaust. The operating cost of a combustion engine will be drastically reduced with much higher performance.

Device and method of generating hydrogen from water and utilizing simultaneously the generated hydrogen gas as alternative fuel or supplemental for automotive and other engines as means to replace up to at least as much as 80% of the hydrocarbon fuels used by such engines. The hydrogen generating device comprises an electrolytic cell or combination of two or more cells energized by a high density direct current of as much as 5,000 amperes, such electrical energy derived from the automotive engine by transforming mechanical energy to electrical energy by means of a direct current generator. The electrolytic cell or cells is supplied by a continuous feed water supply system. Increased capacities are possible due to high amperage loads attainable by the electrolytic cell without overheating. This is necessary to produce the requisite amount of hydrogen gas fuel capable of operating automotive and other engines, for example, with a fuel mixture of hydrogen and only 20% by volume of the gasoline fuel usually used in the engine, after a steady state condition is achieved. The electrolytic cell or cells are equipped with means to control energy load, water flow, gas flow, gas pressure, and presenting the hydrogen gas fuel into the combustion chambers of the automotive and other engines.

A fuel supply system is disclosed for use with a vehicle propulsion system such as an internal combustion engine or a fuel cell system. The fuel supply system includes a water supply, fuel supply, and fuel conversion device coupled to the water and fuel supplies for generating hydrogen from the water and fuel and supplying the hydrogen to an intake manifold of the propulsion system with which the fuel supply system is used. The fuel conversion device preferably includes a vaporization chamber, an inlet nozzle for introducing fine droplets of fuel and water into the vaporization chamber, an air inlet for introducing air into the vaporization chamber to create turbulence in the chamber, a heater in the vaporization chamber for heating the turbulent fuel/water mix at temperatures that cause the mix to convert into hydrogen, and an outlet for supplying the generated hydrogen and air to the vehicle propulsion system.

A hydrogen generating system is provided for use in internal combustion engines for increasing the efficiency of the engine and decreasing emissions from the engine. The hydrogen generating system has an electrolysis cell for generating hydrogen and oxygen gases by electrolysis of an aqueous solution, a power source for providing electrical power to the electrolysis cell, an outflow means for introducing the generated gases into the intake manifold system of an internal combustion engine, a monitoring means for monitoring the operating conditions of the hydrogen generating system, and a control means connected to the monitoring means for controlling the operation of the hydrogen generating system in response to the monitoring means. The invention is also directed to a controller for controlling a hydrogen generating system for use in an internal combustion engine for increasing the efficiency of the engine and decreasing emissions from the engine. The controller has at least one interface means for receiving information on the operating conditions of the hydrogen generating system, at least one control means for controlling a parameter of the hydrogen generating system, and a logic circuit connected to the interface means and control means for providing instructions to the control means in response to the information received from the interface means.

While these engines may be suitable for the purposes for which they were designed, they would not be as suitable for the purposes of the present invention, as hereinafter described.

SUMMARY OF THE PRESENT INVENTION

A primary object of the present invention is to provide an internal combustion engine with a source of hydrogen as a fuel additive.

Another object of the present invention is to provide a an internal combustion engine using hydrogen and hydrocarbon as a fuel source.

Yet another object of the present invention is to provide a hydrogen generator using salt water as an electrolyte.

Still yet another object of the present invention is to provide a hydrogen generator wherein the electrolyte uses salt has means for carrying current.

Another object of the present invention is to provide a hydrogen generator means for reducing hydrocarbon emission in an internal combustion engine by using hydrogen as a fuel additive derived from salt water.

Yet another object of the present invention is to provide a fuel source derived from dissociating diatomic hydrogen and oxygen from salt water.

Additional objects of the present invention will appear as the description proceeds.

The present invention overcomes the shortcomings of the prior art by providing an apparatus for dissociating diatomic molecules of hydrogen and oxygen from salt water, such as sea or ocean water, and using the hydrogen as a fuel source in an internal combustion engine either as a sole fuel source or as a fuel additive for hydrocarbon fuels.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawings in which.

DESCRIPTION OF THE REFERENCED NUMERALS

Figure 1:
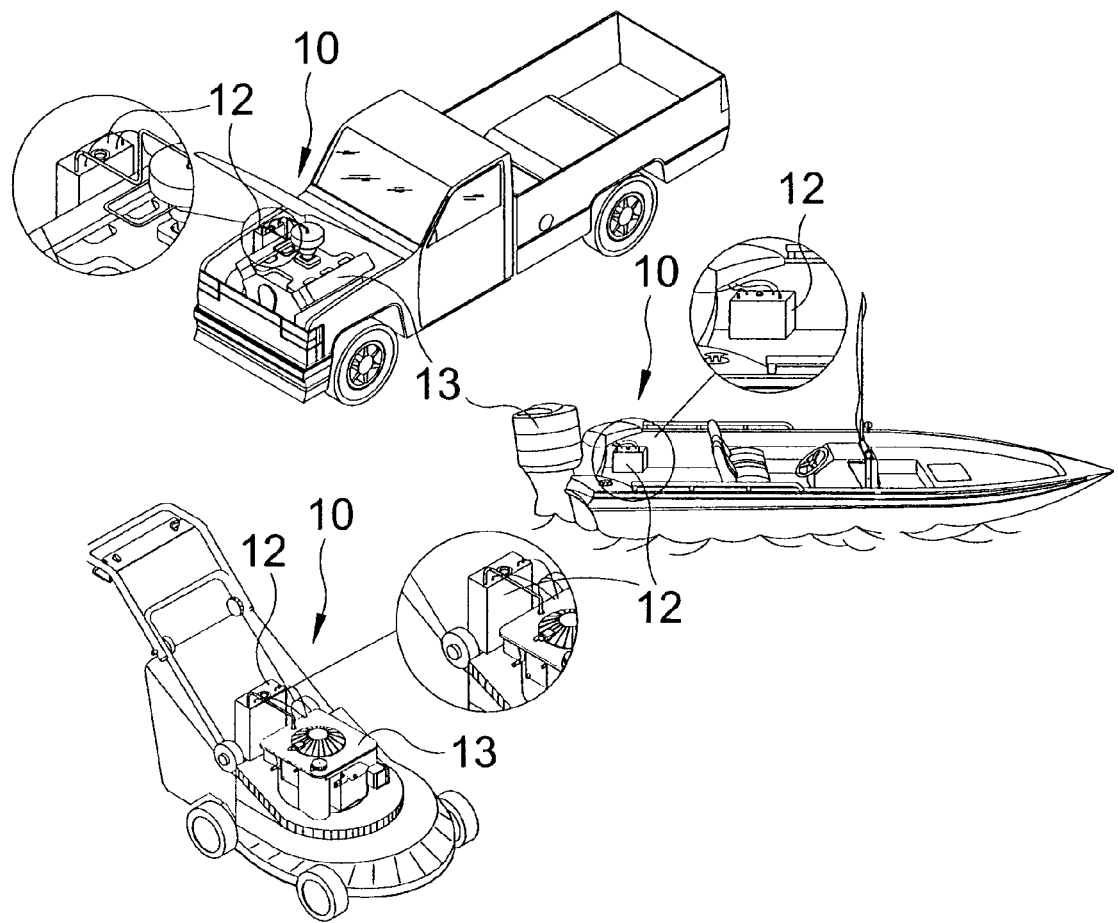
FIG. 1 is a perspective view of the present invention in use.

Turning now descriptively to the drawings, in which similar reference characters denote similar elements throughout the several views, the figures illustrate the Hydrogen Addition to Hydrocarbon Fuel for an Internal Combustion Engine. With regard to the reference numerals used, the following numbering is used throughout the various drawing figures.

- 10 Hydrogen Addition to Hydrocarbon Fuel for an Internal Combustion Engine
- 12 hydrogen generator
- 13 internal combustion engine
- 14 electrolyte tank
- 16 electrolytic solution
- 18 saltwater solution
- 20 positive charging means
- 22 negative charging means
- 24 hydrogen molecules
- 26 oxygen molecules
- 28 partition wall
- 30 hydrogen port
- 32 air gap
- 34 oxygen vent
- 36 hydrogen delivery means
- 38 hydrogen regulation means
- 40 anode
- 42 cathode
- 44 hydrocarbon fuel
- 46 fuel/air mixing means
- 48 carburetor
- 50 fuel tank
- 52 fuel supply line
- 54 air filter assembly
- 56 air filter housing
- 58 air filter element
- 60 combustion chamber
- 62 venturi mixing tube
- 64 first end of 62
- 66 second end of 62
- 68 fuel intake port
- 70 manual switch element
- 72 key switch
- 74 toggle switch
- 76 rheostat
- 78 hydrogen supply line
- 80 hydrogen sensor
- 82 fuel regulator
- 84 oxygen sensor
- 86 digital flow control and data acquisition processor
- 88 desalinization module
- 90 drain element
- 92 DC power supply
- 94 fuel pump
- 96 non-corrosive coating

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

FIG. 1 is a perspective view of the present invention 10 in use. Shown is a perspective view of the present invention 10 in use wherein a motor vehicle having an internal combustion engine 13 has a hydrogen generator 12

Figure 2:
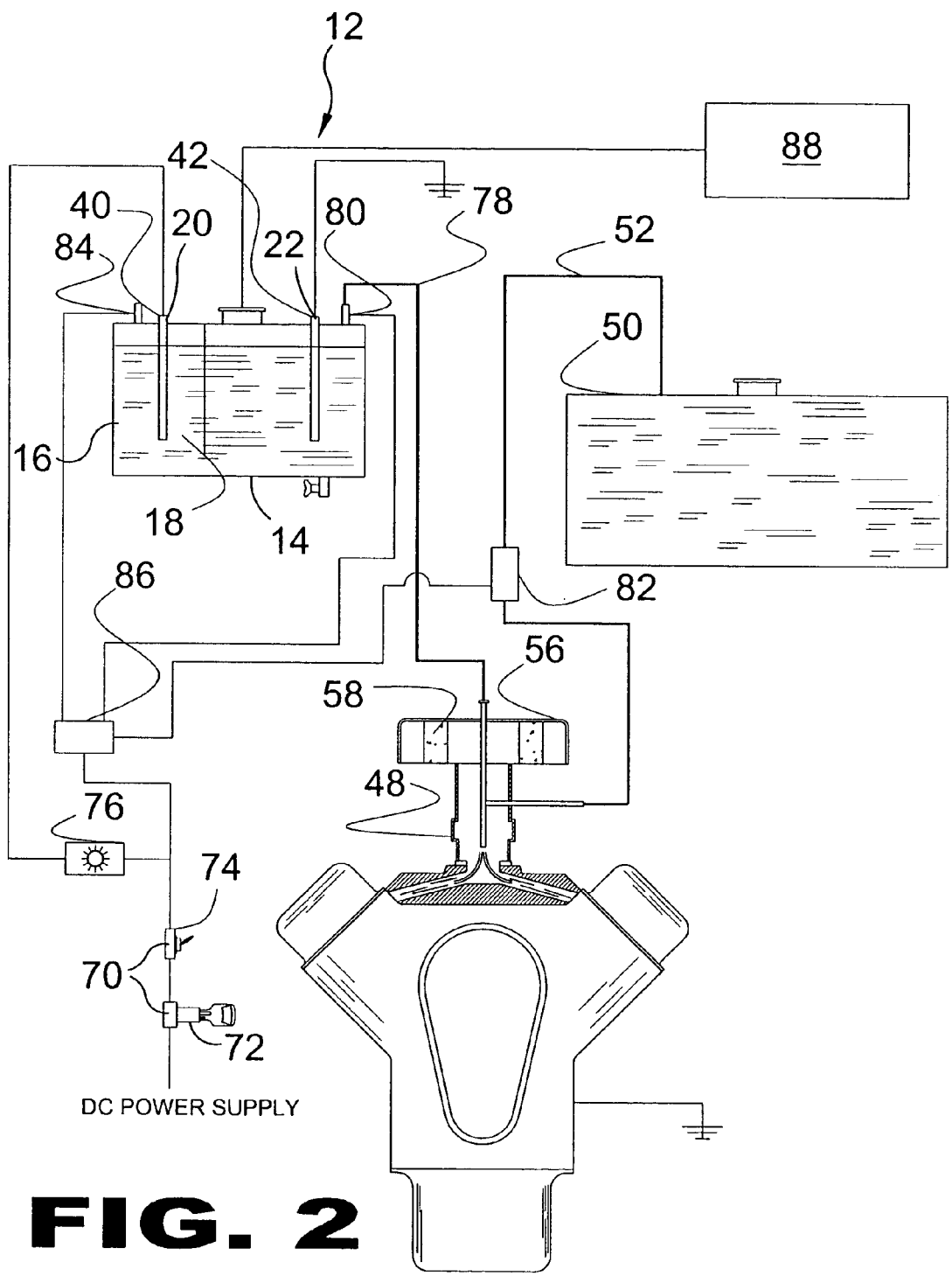
FIG. 2 is an illustrative view of the present invention.

FIG. 2 is an illustrative view of the present invention 10. Shown is a schematic view of the present invention 10 comprising an internal combustion engine 13 having a hydrogen generator 12 supplying hydrogen 24 that is mixed with the hydrocarbon fuel 44. An internal combustion engine 13 has a hydrogen generator 12 which dissociates hydrogen 24 and oxygen 26 from a saltwater solution 18 whereupon the oxygen 26 is vented and the hydrogen 24 is metered into the carburetor 48 of an internal combustion engine 13 using a hydrocarbon fuel 44. The hydrogen 24 apparatus will increase engine efficiency while reducing the use of the hydrocarbon fuel 44 thereby reducing toxic emissions. The hydrogen generator 12 comprises an electrolyte tank 14 for containing an electrolytic solution 16. An oxygen vent 34 provides a means of egress for the released oxygen molecules 26 and a hydrogen port 30 is included with an associated hydrogen supply line 78 for transferring the harvested hydrogen 24 to the carburetor 48. Additionally the electrolyte tank 14 has an interiorly positioned partition 28 with an anode 40 and cathode 42 disposed on opposing sides thereof. Hydrogen 24 is drawn by intake manifold vacuum from the cathode 42 portion of the hydrogen generator 12. Hydrocarbon fuel 44 is mixed with the hydrogen 24 at the intersection of the venturi mixing tube 62 and the fuel supply line 52 before being injected into the combustion chamber 60. The oxygen 26 will be vented while the hydrogen 24 will be conducted to an apparatus for combination with the hydrocarbon fuel 44 for injection into the combustion chambers 60. An electrolytic solution 16 is desalinized by a desalinization module 88 prior to usage in the hydrogen generator 12. Additives may also be introduced at the hydrogen generator 12 to desalinize the electrolytic solution 16. The hydrogen generator 12 dissociating diatomic molecules of hydrogen 24 and oxygen 26 from a saltwater solution 18, such as sea or ocean water, and using the hydrogen 24 as a fuel source for an internal combustion engine 13 either as a sole fuel source or as a fuel additive for hydrocarbon fuels 44. The saltwater solution 18 provides a current path that is more efficient than water and doesn't require additives to the electrolytic solution 16 to enhance current flow. The hydrocarbon fuel 44 mixture is controlled by the intake manifold vacuum. The mixture ratio is determined by flow rates and orifice size in the venturi mixing tube 62. An additional element of the present invention 10 would be a non-corrosive coating 96 on the combustion chamber 60 walls and pistons to prevent corrosion from salt in the electrolytic solution 16. The circuit is controlled by two manual switch elements 70 in series with a DC power supply 92 and a rheostat 76. The circuit of the anode 40, saltwater solution 18 and cathode 42 is closed when both manual switch elements (a key switch 72 and a toggle switch74) are made. Hydrogen 24 production is regulated by the rheostat 76. Digital flow control and data acquisition processors 86 regulate and monitor the mixture ratio of hydrogen 24 and hydrocarbon fuel 44 to the carburetor 48. An electrical charge from a regulated power source is applied to the electrolytic solution 16 yielding hydrogen 24 and oxygen 26. Hydrogen 24 is transported to the venturi mixing tube 62 while oxygen 26 is vented to atmosphere. The hydrocarbon fuel 44 is pumped to the venturi mixing tube 62 by a fuel pump 94. Whereupon the hydrocarbon fuel 44/hydrogen 24 mixture is injected into the combustion chamber 60.

Figure 3:
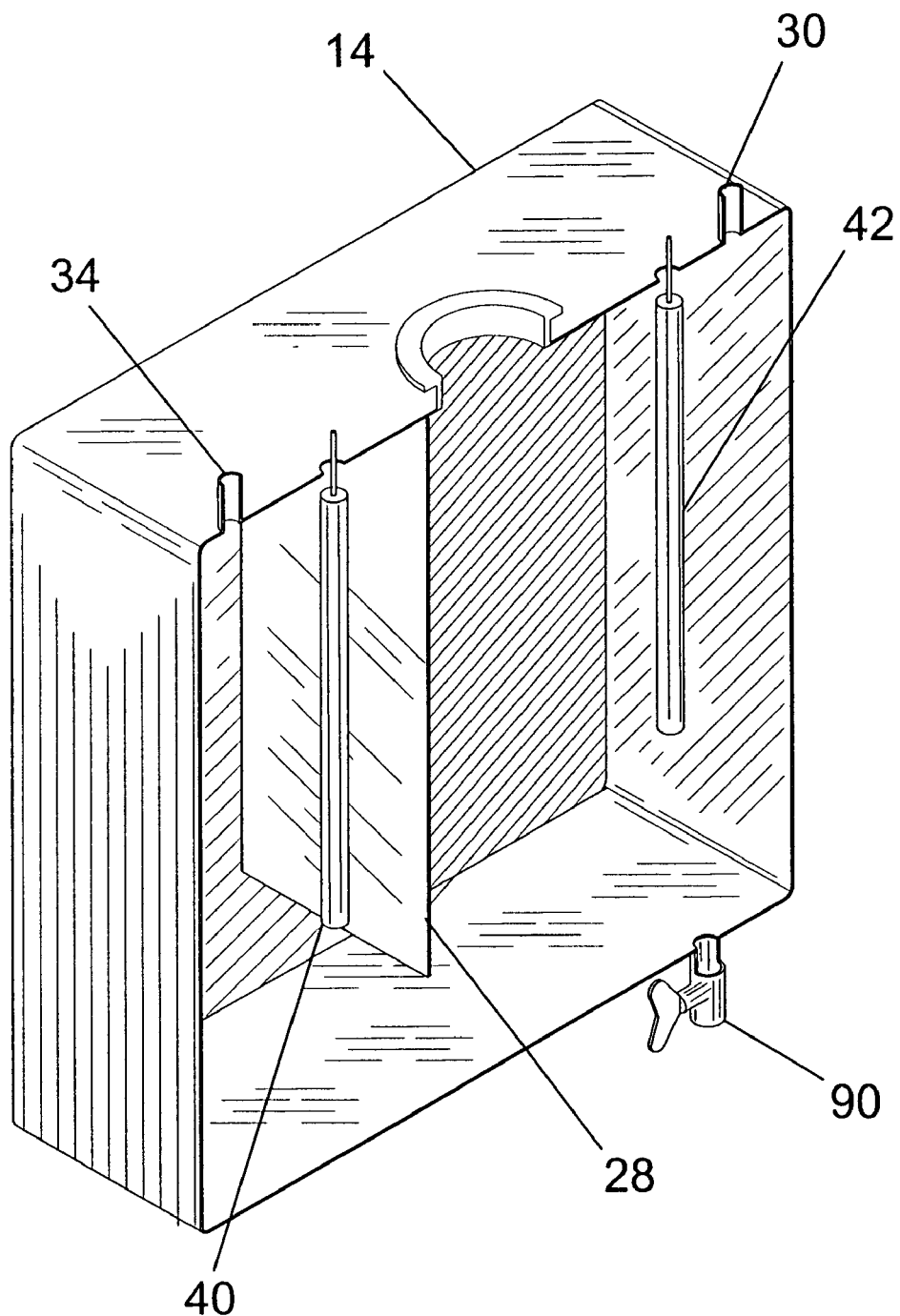
FIG. 3 is a sectional view of the hydrogen generator.

FIG. 3 is a sectional view of the hydrogen generator 12. Shown is a sectional view of the hydrogen generator 12. The hydrogen generator 12 comprises an electrolyte tank 14 for containing an electrolytic solution 16. An oxygen vent 34 provides a means of egress for the released oxygen molecules 26 and a hydrogen port 30 is included with an associated hydrogen supply line 78 for transferring the harvested hydrogen 24 to the carburetor 48. Additionally the electrolyte tank 14 has an interiorly positioned partition 28 with an anode 40 and cathode 42 disposed on opposing sides thereof.

Figure 4:
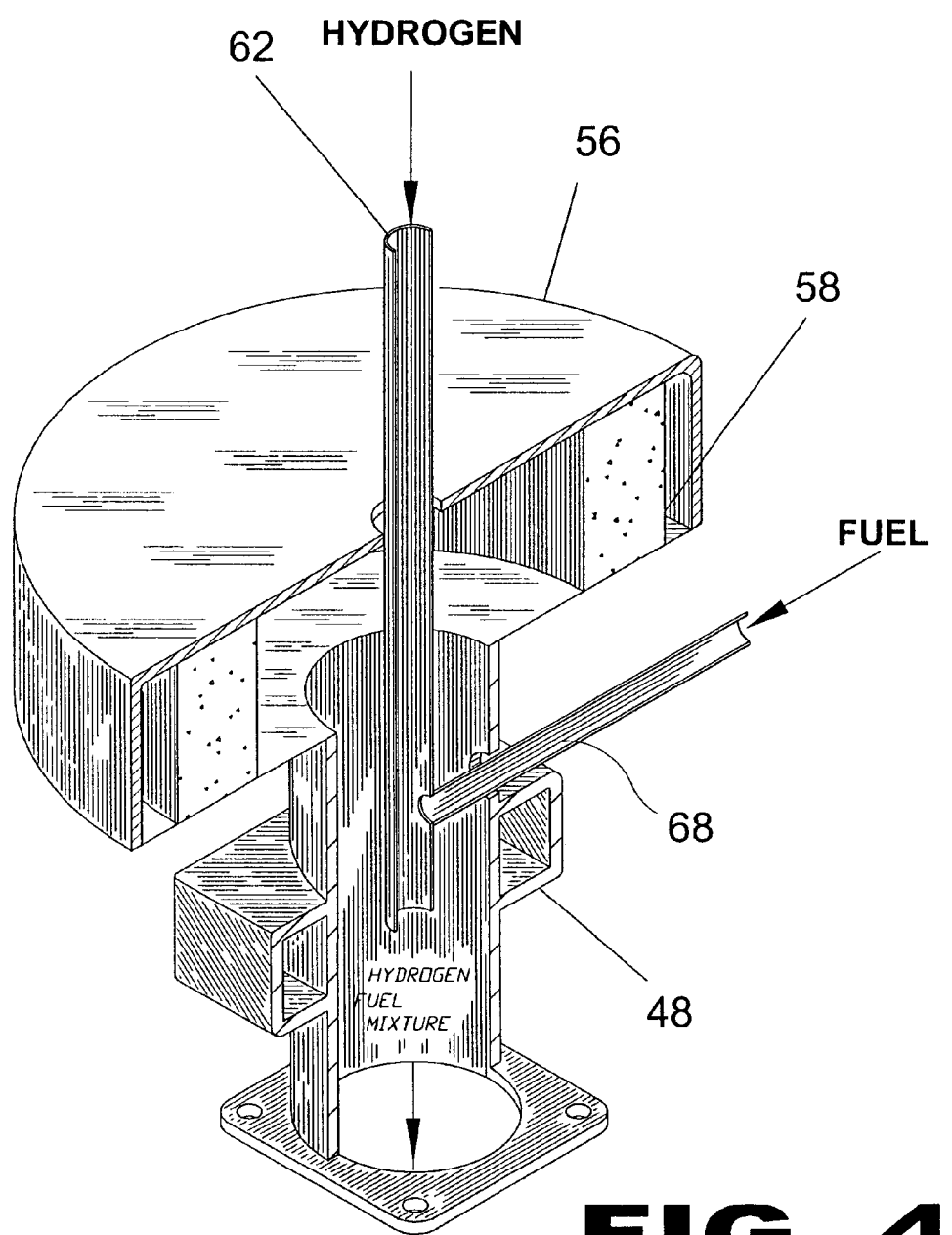
FIG. 4 is a perspective view of the venturi mixing tube and carburetor.

FIG. 4 is a perspective view of the venturi mixing tube 62 and carburetor 48. Shown is a perspective view of a venturi mixing tube 62 and carburetor 48. Hydrogen 24 is drawn by intake manifold vacuum from the cathode 42 portion of the hydrogen generator 12. Hydrocarbon fuel 44 is mixed with the hydrogen 24 at the intersection of the venturi mixing tube 62 and the fuel supply line 52 before being injected into the combustion chamber 60.

Figure 5:
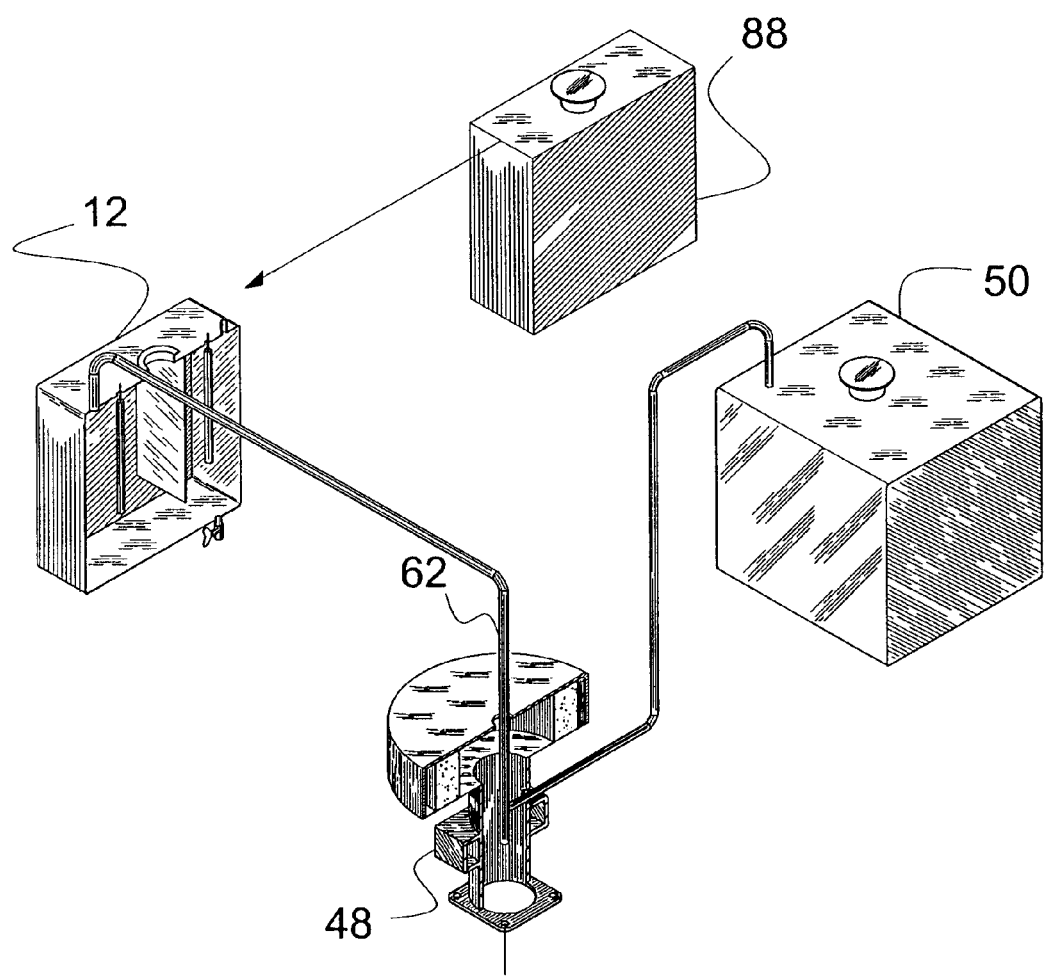
FIG. 5 is a perspective view of means for mixing hydrogen and hydrocarbon fuel.

FIG. 5 is a perspective view of means for mixing hydrogen 24 and hydrocarbon fuel 44. Shown is the hydrogen generator 12 where electrolysis will dissociate diatomic molecules of hydrogen 24 and oxygen 26 from a saltwater solution 18. The oxygen 26 will be vented while the hydrogen 24 will be conducted to an apparatus for combination with the hydrocarbon fuel 44 for injection into the combustion chambers 60. An electrolytic solution 16 is desalinized by a desalinization module 88 prior to usage in the hydrogen generator 12. Additives may also be introduced at the hydrogen generator 12 to desalinize the electrolytic solution 16.

Figure 6:
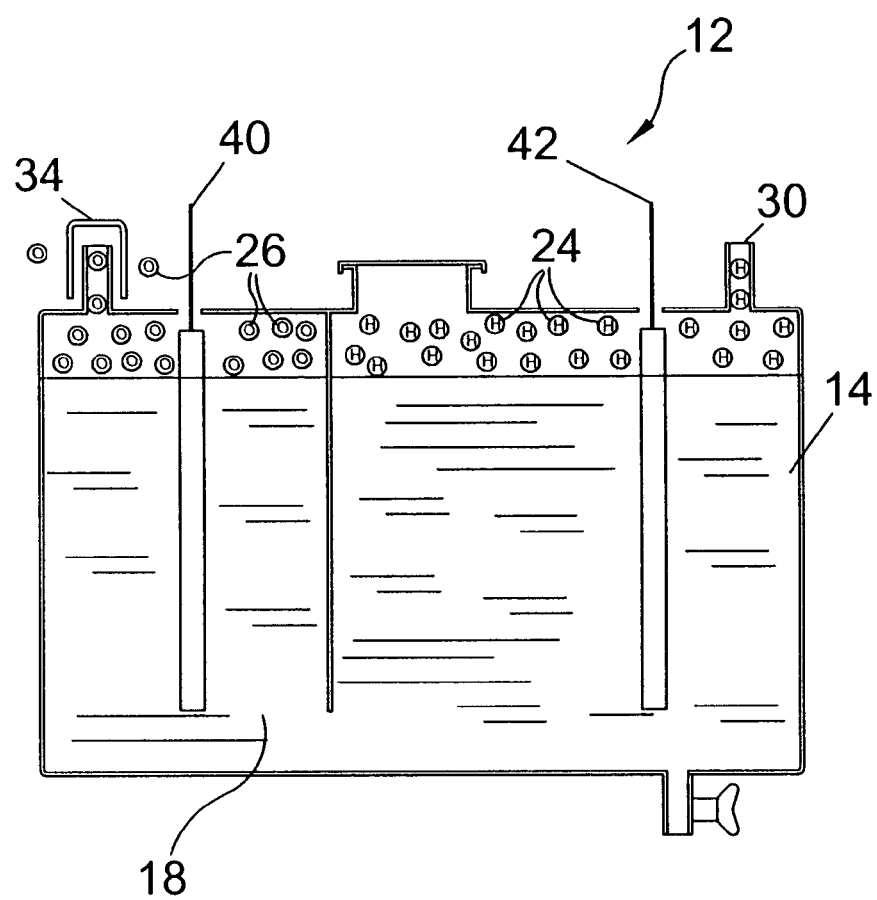
FIG. 6 is a sectional side view of the hydrogen generator having a charge applied.

FIG. 6 is a sectional side view of the hydrogen generator 12 having a charge applied thereto. Shown is the hydrogen generator 12 dissociating diatomic molecules of hydrogen 24 and oxygen 26 from a saltwater solution 18, such as sea or ocean water, and using the hydrogen 24 as a fuel source for an internal combustion engine 13 either as a sole fuel source or as a fuel additive for hydrocarbon fuels 44. The saltwater solution 18 provides a current path that is more efficient than water and doesn't require additives to the electrolytic solution 16 to enhance current flow.

Figure 7:
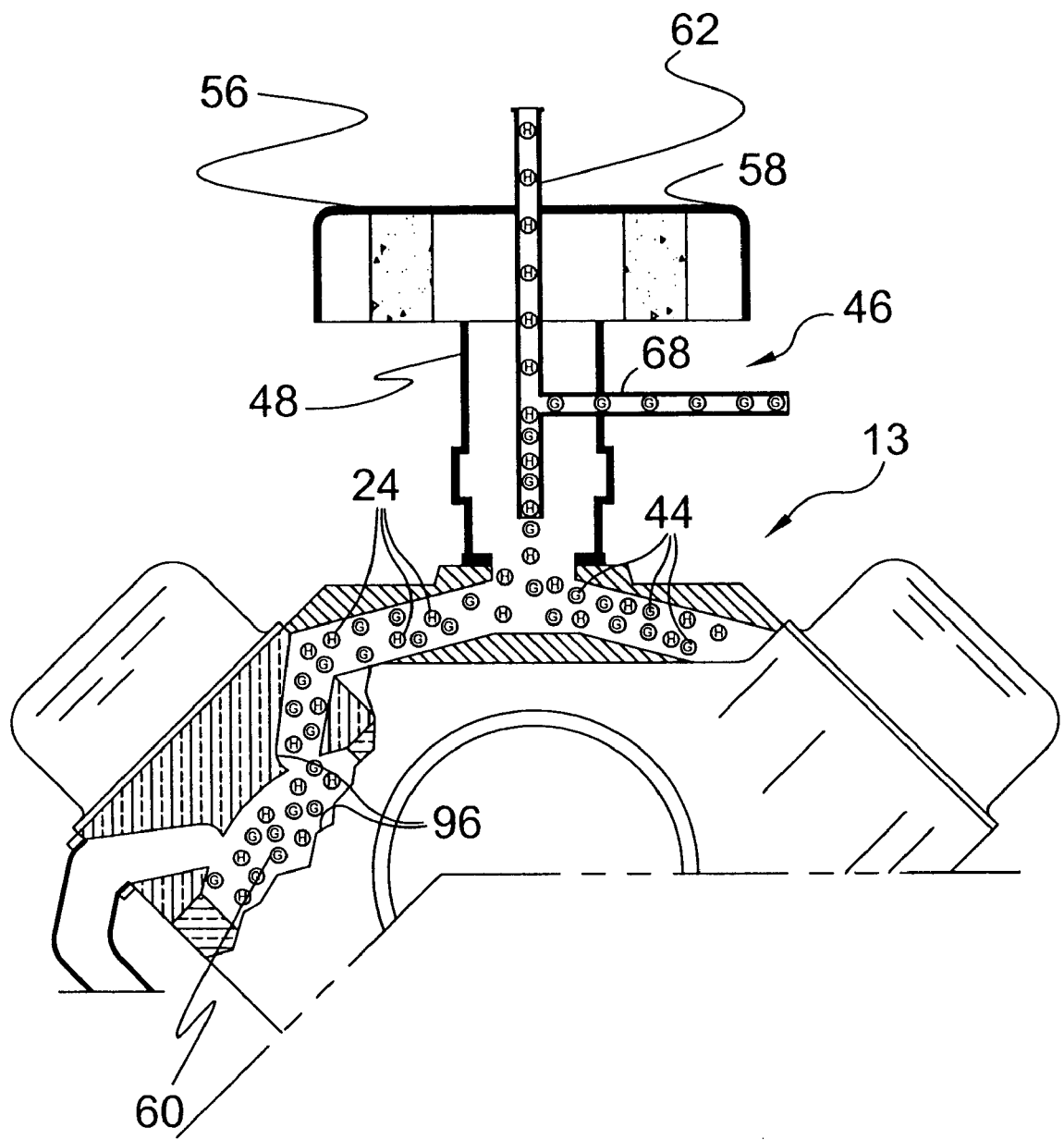
FIG. 7 is a perspective view of the internal combustion engine using hydrogen and hydrocarbon fuel.

FIG. 7 is a sectional view of the internal combustion engine 13 using hydrogen 24 and hydrocarbon fuel 44. Shown is a sectional view of the present invention 10 supplying an internal combustion engine 13 with hydrogen 24 and hydrocarbon fuel 44. The hydrocarbon fuel 44 mixture is controlled by the intake manifold vacuum. The mixture ratio is determined by flow rates and orifice size in the venturi mixing tube 62. An additional element of the present invention 10 would be a non-corrosive coating 96 on the combustion chamber 60 walls and pistons to prevent corrosion from salt in the electrolytic solution 16.

Figure 8:
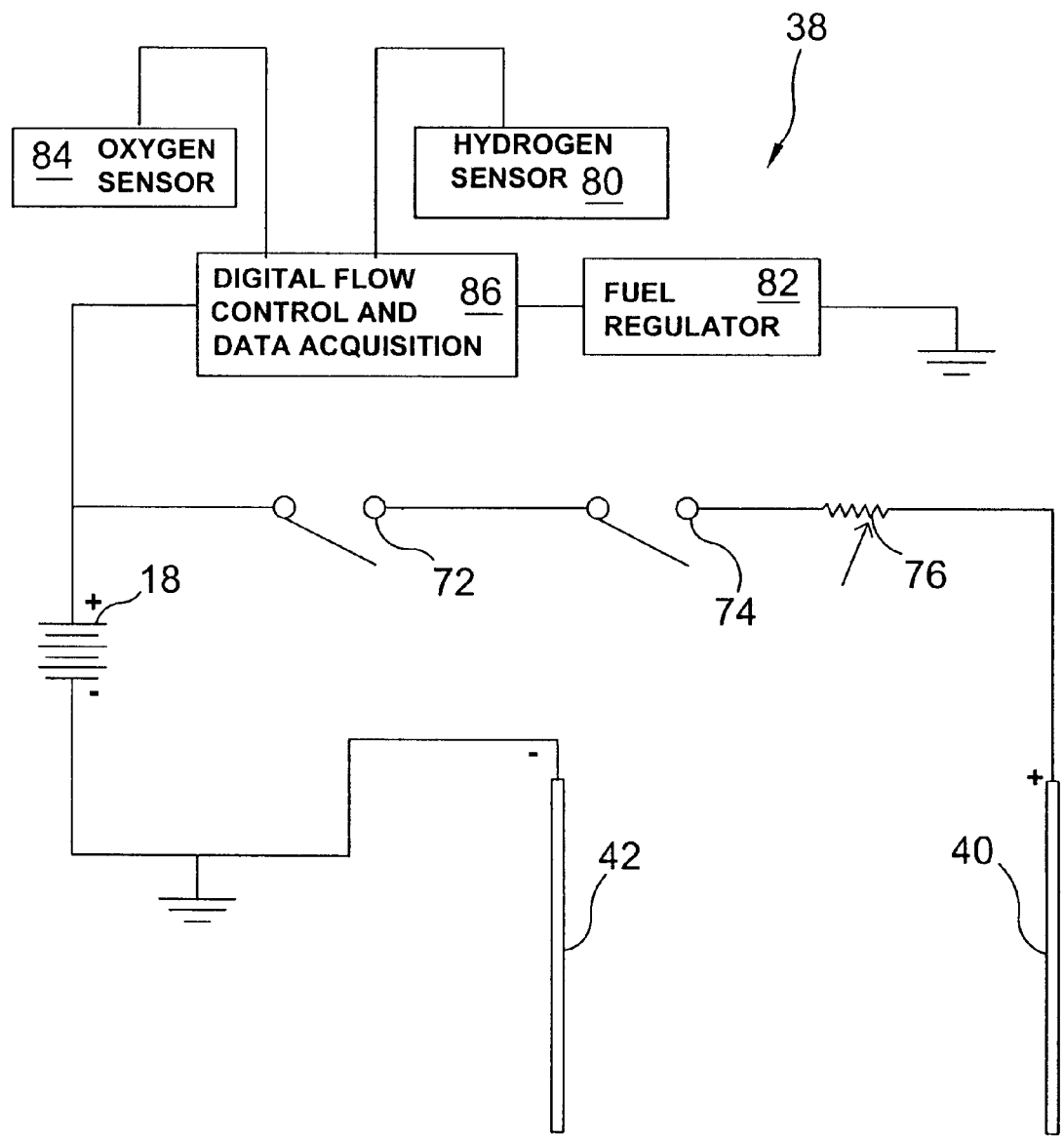
FIG. 8 is an electrical schematic of the present invention.

FIG. 8 is an electrical schematic of the present invention 10. Shown is the electrical schematic of the present invention 10. The circuit is controlled by two manual switch elements 70 in series with a DC power supply 92 and a rheostat 76. The circuit of the anode 40, saltwater solution 18 and cathode 42 is closed when both manual switch elements (a key switch 72 and a toggle switch74) are made. Hydrogen 24 production is regulated by the rheostat 76. Digital flow control and data acquisition processors 86 regulate and monitor the mixture ratio of hydrogen 24 and hydrocarbon fuel 44 to the carburetor 48.

Figure 9:
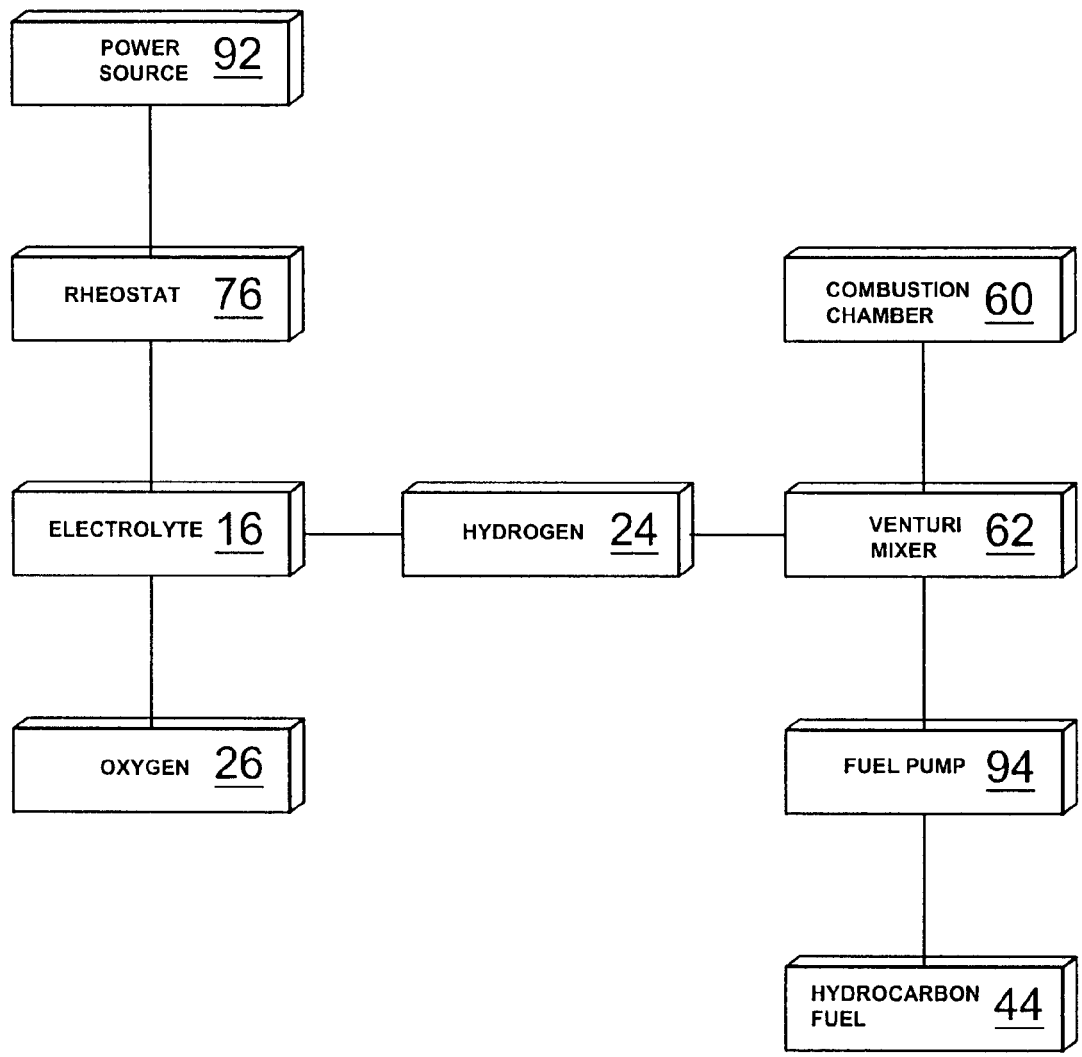
FIG. 9 is a block diagram of the basic elements of the method of the present invention.

FIG. 9 is a block diagram of the basic elements of the method of the present invention 10. Shown is a block diagram of the basic elements of the present invention 10. An electrical charge from a regulated power source is applied to the electrolytic solution 16 yielding hydrogen 24 and oxygen 26. Hydrogen 24 is transported to the venturi mixing tube 62 while oxygen 26 is vented to atmosphere. The hydrocarbon fuel 44 is pumped to the venturi mixing tube 62 by a fuel pump 94. Whereupon the hydrocarbon fuel 44/hydrogen 24 mixture is injected into the combustion chamber 60.

Figure 10:
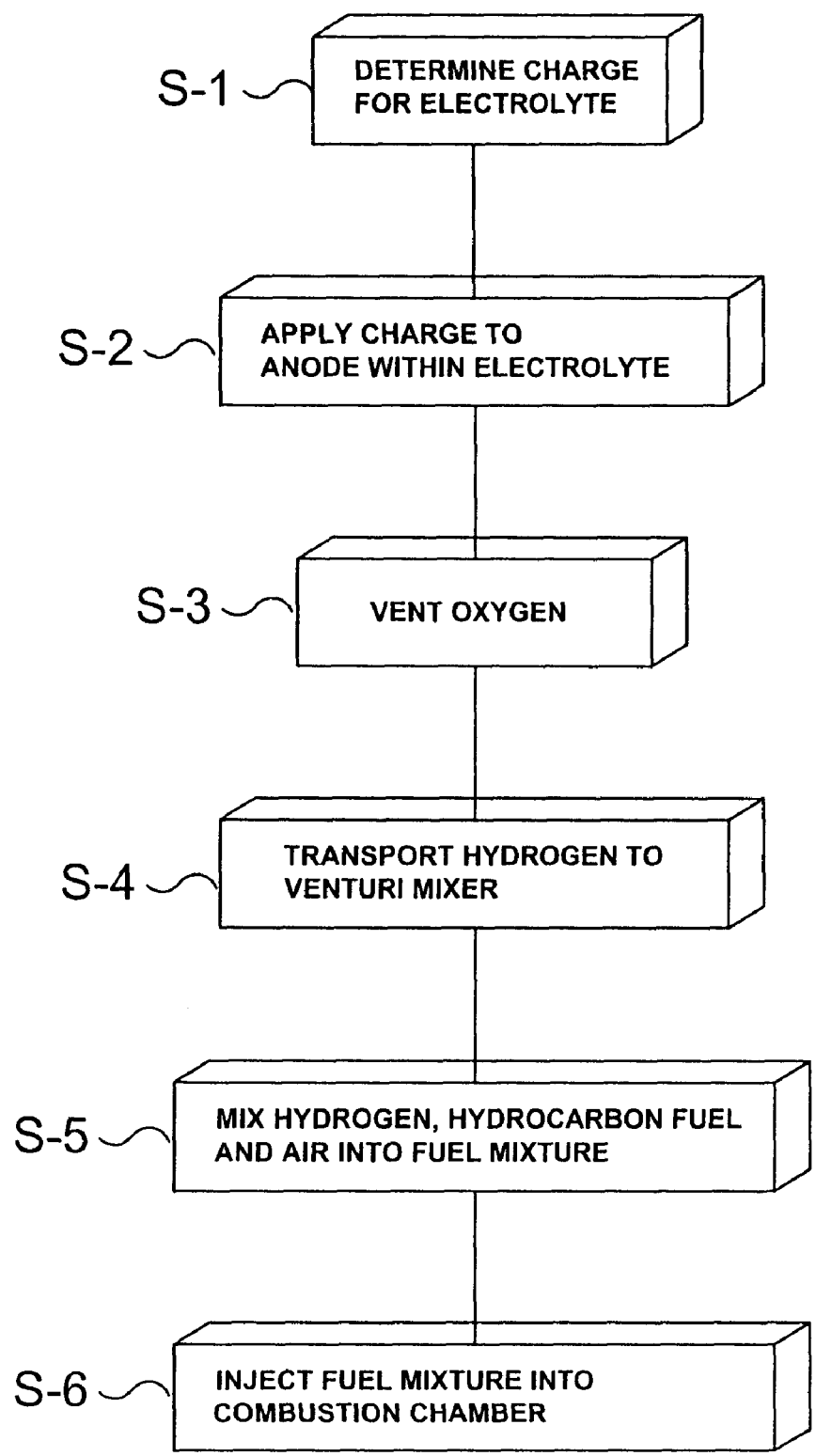
FIG. 10 is a block diagram of the method of the present invention.

FIG. 10 is a block diagram of the method of the present invention 10. Shown is a block diagram of the method of the present invention 10 which is used to dissociate an electrolytic solution 16 into diatomic molecules of oxygen 26 and hydrogen 24. The hydrogen 24 is used as a sole source of power or mixed with a hydrocarbon fuel 44 in a venturi mixer. The hydrocarbon fuel 44 mixture is atomized in the carburetor 48 prior to introduction to the combustion chamber 60.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A hydrogen addition to hydrocarbon fuel for an internal combustion engine comprising:
   a) an internal combustion engine;
   b) a hydrogen generator for separating and removing hydrogen from a fluid containing hydrogen, said hydrogen generator comprising:

i) an electrolyte tank;
   ii) an electrolytic solution containing hydrogen substantially filling said electrolyte tank so as to leave an air gap at the top portion thereof;
   iii) means for applying a positive charge and a negative charge in spaced apart relation to one another within said electrolytic solution to initiate the dissociation of diatomic hydrogen molecules therefrom;
   vi) a partition wall disposed between said positive and negative charging means extending from one side of said electrolyte tank to the other side and from the top to a portion near the bottom thereby dividing said electrolytic solution into a positively charged portion and a negatively charged portion in communication with one another below said partition wall;
   v) a hydrogen port disposed on the top of said electrolyte tank in communication with said air gap proximal to said negative charging means; and
   vi) an oxygen vent disposed on the top of said electrolyte tank in communication with said air gap proximal to said positive charging means;
   c) means for delivering captured hydrogen from said hydrogen generator and hydrocarbon fuel to said engine comprising a venturi mixing tube for delivering hydrogen into a carburetor connected to an intake manifold of said engine and a fuel line for discharging hydrocarbon fuel directly into said venturi mixing tube carrying hydrogen; and
   d) means for regulating the flow of hydrogen to said engine.

2. A hydrogen addition to hydrocarbon fuel for an internal combustion engine as recited in claim 1, wherein said electrolyte solution is a saltwater solution.

3. A hydrogen addition to hydrocarbon fuel for an internal combustion engine as recited in claim 2, wherein said positive charging means is an anode.

4. A hydrogen addition to hydrocarbon fuel for an internal combustion engine as recited in claim 3, wherein said negative charging means is a cathode.

5. A hydrogen addition to hydrocarbon fuel for an internal combustion engine as recited in claim 4, wherein said hydrogen delivery means is configured in such a manner that the fuel pumped into said venturi mixing tube and into said carburetor creates a venturi effect that draws said hydrogen therein to mix with said fuel and said air to formulate a high efficiency, low emission, hydrogen-enriched hydrocarbon filet for said engine.

6. A hydrogen addition to hydrocarbon fuel for an internal combustion engine as recited in claim 5, wherein said hydrogen regulating means comprises:
   a) at least one manual switch element to allow the user to selectively supply power to said hydrogen generator;
   b) a rheostat in line between said switch element and said anode to allow for selectively adjusting the current applied to said saltwater solution;
   c) a hydrogen sensor in line with said hydrogen port and said hydrogen supply line;
   d) a fuel regulator in line with said fuel supply line;
   e) an oxygen sensor integral with said oxygen vent; and
   f) digital flow control and data acquisition processor in communication with said rheostat, said oxygen sensor, said hydrogen sensor and said fuel regulator.

7. A hydrogen addition to hydrocarbon filet for an internal combustion engine as recited in claim 6, wherein said switch element is a key switch.

8. A hydrogen addition to hydrocarbon filet for an internal combustion engine as recited in claim 6, wherein said switch is a toggle switch.

9. A hydrogen addition to hydrocarbon fuel for an internal combustion engine as recited in claim 6, wherein said switch element is a key switch and a toggle switch in series with one another thus requiring both switches to be in the operating position in order to supply power to said hydrogen generator and said hydrogen regulating means.

10. A hydrogen addition to hydrocarbon fuel for an internal combustion engine as recited in claim 1, further including a desalinization module in communication with said hydrogen generator.

11. A hydrogen addition to hydrocarbon fuel for an internal combustion engine as recited in claim 9, wherein said electrolyte tank further includes a drain element for selectively emptying said electrolyte solution therefrom.

12. A hydrogen addition to hydrocarbon fuel for an internal combustion engine as recited in claim 11, wherein each said combustion chamber and associated piston has a non-corrosive coating.

13. A hydrogen addition to hydrocarbon fuel for an internal combustion engine as recited in claim 12 in which said venturi mixing tube carrying hydrogen passes through said air filter and is aligned with a central axis of said carburetor.

\* \* \* \* \*